Patented Mar. 17, 1942

2,276,918

UNITED STATES PATENT OFFICE 2,276,918

DYESTUFFS OF THE PHTHALOCYANINE SERIES

Berthold Bienert, Leverkusen-Wiesdorf, and Hermann Thielert, Cologne-Merheim, Germany, assignors to General Aniline & Film Corporation, a corporation of Delaware No Drawing. Application June 30, 1939, Serial No. 282,130. In Germany July 14, 1938

5 Claims. (Cl. 260—314)

The present invention relates to new dyestuffs of the phthalocyanine series.

The new dyestuffs which are obtainable in accordance with our present invention may be defined by the following formula:

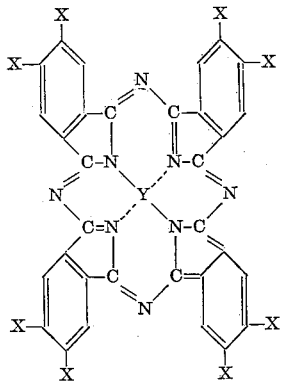

wherein in each of the benzene nuclei one of the X's stands for a sulfonic acid group, whereas the other X stands for a member of the group consisting of O-alkyl and O-aryl, and Y indicates that the molecule contains a heavy metal (such as copper, nickel or cobalt) in complex combination.

These new dyestuffs are capable of directly dyeing cellulose materials such as cotton, viscose or cuprammonium silk. The dyeings obtainable by means of our new dyestuffs combine excellently clear greenish shades with very good fastness properties. These new dyestuffs can also be converted into color lakes by neutralization by means of earth alkali metals such as calcium or barium. Such color lakes are suitable for the dyeing of wallpaper and also for the preparation of graphic prints.

As a modification of our invention as defined above the said substituents are contained in only 1-3 of the benzene nuclei, whereas the remaining nuclei contain other substituents or are free from any substituents. For giving an example, part of the benzene nuclei may be substituted as defined above, whereas the remaining part is substituted merely by halogen atoms or by phenyl groups. As a matter of fact, such asymmetrically substituted products show a decreased solubility in water when compared with the tetrasulphonic acids defined above.

Our new compounds can be prepared according to any one of the methods which are known to effect formation of phthalocyanines. We prefer to start from such phthalocyanine forming materials as contain from the very beginning the sulfonic acid and O-alkyl or O-aryl groups, i. e. the substituents which are characteristic of our final products. Thus, we can start from benzene dicarboxylic acids of the following formula:

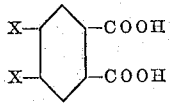

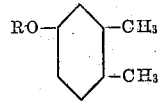

wherein the X's have the above meaning. Such starting materials can be easily obtained by sulfonating a compound of the following formula:

$$R\text{-}O\text{-}\underset{}{\bigcirc}\underset{-CH_3}{-CH_3}$$

R being alkyl or aryl.

The methyl groups can be easily converted into carboxylic acid groups by means of potassium permanganate. The resulting products which contain two carboxylic acid groups and one sulfonic acid group can be easily isolated from their solutions in form of their acid salts. Such acid salts can be directly employed for the preparation of phthalocyanines by heating the same with urea and a copper salt, if desired, in the presence of suitable auxiliary agents, such as boric acid and molybdates or vanadinates. In case asymmetrically substituted phthalocyanines are intended, the said starting materials are employed in admixture with other aromatic o-dicarboxylic acids such as phthalic acid or substitution products thereof such as diphenyl 3.4-dicarboxylic acid. For the preparation of phthalocyanines containing in complex combination other metals than copper the copper salt is replaced by other heavy metal salts such as a nickel salt or a cobalt salt.

The following examples illustrate the invention, the parts being by weight.

Example 1

53 parts of urea are melted and gradually mixed at a temperature of 150-160° C. while stirring strongly with 49.4 parts of the potassium salt of 5-methoxy-4-sulfophthalic acid and thereafter mixed with 0.96 part of ammonmolybdate. Into the melt there is introduced at the same temperature a mixture of 7.4 parts of crystallized copper chloride and 9.3 parts of urea. While adding altogether 26.7 parts of urea from time to time to the melt the same is stirred for about 3-4 hours at 160-165° C.

When the formation of the dyestuff is complete the melt is diluted with water, rendered slightly alkaline by means of caustic soda lye and after filtering the dyestuff is precipitated by addition of common salt. For further refining the dyestuff may be salted out from diluted hydrochloric acid with common salt. The dyestuff thus obtained is easily soluble in water with a bright green coloration and exhibits excellently good fastness properties toward acids and alkalis. It dyes cotton clear, bluish-green shades and yields on wallpaper clear, bluish-green colorations of a good fastness to light.

*Example 2*

45 parts of urea are melted and at 150–160° C. while stirring strongly gradually mixed with 30 parts of the potassium salt of 5-aethoxy-4-sulfophthalic acid and thereafter mixed with 0.96 part of ammonmolybdate. Into the melt there is introduced at the same temperature a mixture of 3.9 parts of crystallized copper chloride and 15 parts of urea. While adding altogether 15 parts of urea from time to time to the melt the same is stirred for about 3–4 hours at 160–165° C.

When the formation of the dyestuff is complete the melt is diluted with some water, this mixture is acidified with hydrochlorid acid and the dyestuff is precipitated by adding common salt. For further refining the dyestuff may be dissolved in water, whereupon the solution is rendered alkaline by means of sodium carbonate and filtered; from the filtrate the dyestuff is precipitated by adding common salt or alcohol.

There is obtained an excellently clear, easily water-soluble dyestuff showing a somewhat more yellowish-green shade than the dyestuff described in Example 1 and having a somewhat greater affinity towards cotton.

In a similar way dyestuffs, being substituted by other alkoxy groups, may be prepared.

If the copper chloride in the preceding examples is substituted by other metal compounds, for instance nickel chloride or cobalt chloride, there are obtained the corresponding nickel and cobalt phthalocyanines.

*Example 3*

30 parts of urea are melted at 150–160° C. and gradually mixed while stirring with 15 parts of the potassium salt of 5-ethoxy-4-sulfophthalic acid, 9.9 parts of 3.6-dichlorophthalic acid anhydride and 0.3 part of ammonmolybdate. Into the melt there is introduced a mixture of 3.9 parts of crystallized copper chloride and 7.5 parts of urea. While adding altogether 22.5 parts of urea from time to time to the melt the same is stirred for about 3–4 hours at 160–165° C.

The reaction mixture is worked up as described in Example 1 or 2; after removing a small part of an insoluble dyestuff there is obtained a sulfonic acid being soluble in water with a green coloration and showing a somewhat more bluish shade than the dyestuff described in Example 2.

*Example 4*

10 parts of 5-methoxy-4-sulfophthalic acid are dissolved in some water, rendered alkaline by means of ammonia and the water is evaporated on the water bath. The ammonium salt obtained in this way is introduced at 155–160° C. while stirring into 15 parts of urea. To the melt there are added 0.05 part of ammonium molybdate and 1.4 parts of copper chloride. While adding altogether 6.4 parts of urea from time to time to the melt the same is heated to 160–165° C. On working up the same dyestuff is obtained as described in Example 1.

*Example 5*

Into a melt of 7.35 parts of urea are introduced while stirring at 160–165° C.
6.58 parts of the potassium salt of 5 N-butoxy-4-sulfophthalic acid
0.14 part of ammonium molybdate and
0.785 part of copper chloride.

While adding 4.5 parts of urea from time to time to the melt the same is heated to 160–165° C. for about 3 hours. There is obtained an easily water-soluble dyestuff which dyes wool clear, green shades.

*Example 6*

13.2 parts of urea are melted and mixed while stirring at 160–165° C. with
13.2 parts of the potassium salt of 5-phenoxy-4-sulfophthalic acid
0.26 part of ammonium molybdate and
1.2 parts of copper chloride.

While adding gradually altogether 8.2 parts of urea to the melt the same is heated to 160–165° C. for 4 hours. After cooling the melt is dissolved in water, whereupon the solution is rendered alkaline by means of caustic soda lye and the dyestuff is precipitated at 80–90° C. by addition of common salt. In order to remove the copper completely the dyestuff may be dissolved in water once more and salted out at 80–90° C. with common salt after addition of hydrochloric acid until the reaction has assumed a Congo acid reaction. There is obtained an easily soluble dyestuff dyeing cotton and wool clear, bluish-green shades and being excellently suitable for the preparation of color lakes.

The 5-phenoxy-4-sulfophthalic acid can be easily prepared in known manner according to the following method: the 1.2-dimethylbenzene-5-bromo-4-sulfonic acid (potassium salt) is heated to about 240° C. with phenol in the presence of potassium carbonate and of a small quantity of a copper salt; thereby the bromine is substituted by the phenoxy-radicle. Thereupon the methyl groups are oxidized by means of potassium permanganate into carboxylic acid groups.

*Example 7*

Into a melt of 57 parts of urea are introduced at 160–165° C.
25.8 parts of the potassium salt of 5-methoxy-4-sulfophthalic acid,
31.2 parts of the potassium salt of 4'-sulfodiphenyl-3.4-dicarboxylic acid,
1.32 parts of ammonium molybdate and finally
8.5 parts of copper chloride.

The temperature of the melt is kept at 165° C. for 4 hours. Having been cooled the melt is dissolved in water, rendered alkaline by means of soda lye and the dyestuff is salted out by addition of a 20% common salt solution. Thereupon the dyestuff is redissolved from water twice by means of a common salt solution. There is obtained a dyestuff dyeing cotton greenish shades, and containing on the average two methoxy groups in the molecule. An analogous dyestuff is obtained by using 5-ethoxy-4-sulfophthalic acid as starting material.

Example 8

20 parts of urea are melted and treated while stirring at 160–165° C. with 20 parts of the potassium salt of 5-methoxy-4-sulfonic acid 0.4 part of ammonium molybdate and 3.28 parts of nickel chloride.

While adding 3.5 parts of urea to the melt the temperature is maintained at 160–165° C. for 2 hours. On working up according to Example 1 there is obtained a needle-like crystallized dyestuff showing a somewhat more bluish and duller coloration than the corresponding copper compound. By treating with sodium hydrosulfite and diluted soda lye a reddish-blue leuco compound will be obtained.

Example 9

If the nickel chloride as described in Example 8 is substituted by 1.8 parts of anhydrous cobalt chloride there is obtained a green-blue cobalt complex showing an olive-brown coloration in the vat.

Example 10

If the nickel chloride in Example 8 is substituted by 1.76 parts of anhydrous ferrous chloride there is obtained a phthalocyanine soluble in diluted alkalies with a greenish coloration and soluble in pyridin-water with clearly green coloration while forming an addition compound.

We claim:

1. The products of the formula:

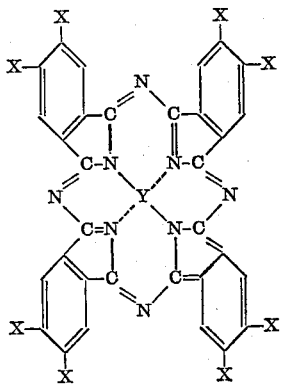

wherein in each of the benzene nuclei one of the X's stands for a sulfonic acid group, the remaining X standing for a member of the group consisting of alkoxy and aryloxy and Y indicates that the products contain a heavy metal in complex combination.

2. The products of the formula:

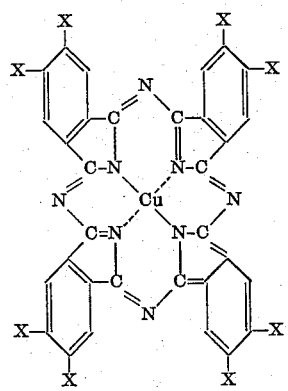

wherein in each of the benzene nuclei one of the X's stands for a sulfonic acid group, the remaining X standing for an alkoxy group.

3. The product as claimed in claim 2 wherein the alkoxy group is a methoxy group.

4. The product as claimed in claim 2 wherein the alkoxy group is an ethoxy group.

5. The product as claimed in claim 1 wherein the aryloxy group is a phenoxy group.

BERTHOLD BIENERT.
HERMANN THIELERT.